R. LEUMANN.
AUTOMATIC WEIGHING DEVICE.
APPLICATION FILED MAY 27, 1919.

1,336,705.

Patented Apr. 13, 1920.
3 SHEETS—SHEET 1.

Inventor:
Richard Leumann,
By
atty.

R. LEUMANN.
AUTOMATIC WEIGHING DEVICE.
APPLICATION FILED MAY 27, 1919.
1,336,705.
Patented Apr. 13, 1920.
3 SHEETS—SHEET 3.
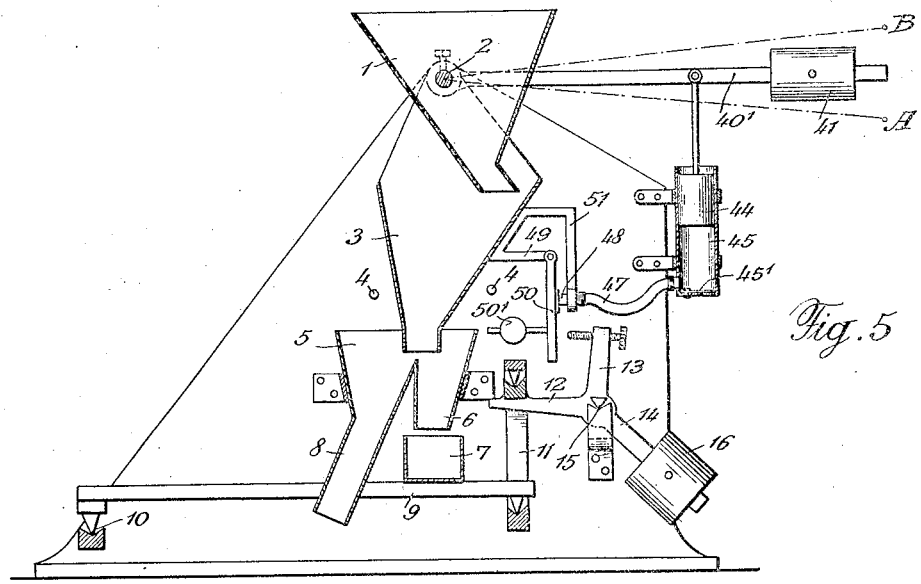
Fig. 5
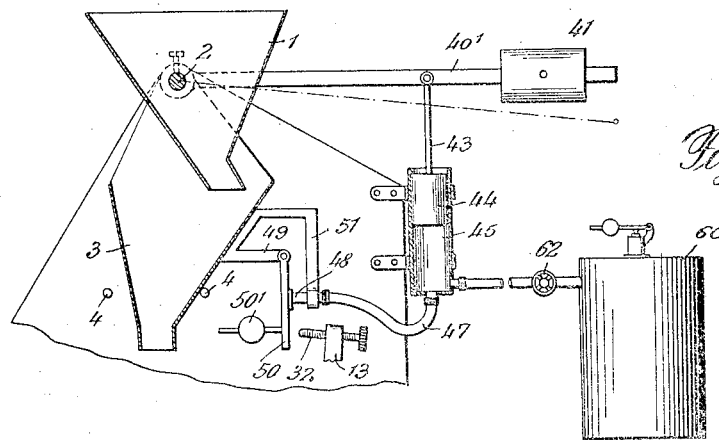
Fig. 6
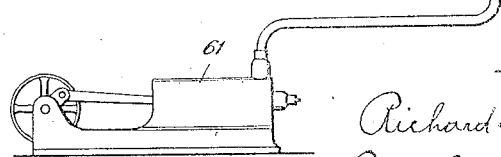
Inventor:
Richard Leumann,
By Henry [signature]
Atty.

UNITED STATES PATENT OFFICE.

RICHARD LEUMANN, OF CHAILLY-SUR-LAUSANNE, SWITZERLAND.

AUTOMATIC WEIGHING DEVICE.

1,336,705.   Specification of Letters Patent.   Patented Apr. 13, 1920.

Application filed May 27, 1919. Serial No. 300,165.

*To all whom it may concern:*

Be it known that I, RICHARD LEUMANN, a citizen of the Republic of Switzerland, residing at Villa La Loex, Chailly-sur-Lausanne, Switzerland, have invented certain new and useful Improvements in Automatic Weighing Devices; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to automatic weighing devices for powdered, granular and liquid material.

It has already been proposed to provide weighing devices with pivotally mounted feed means adapted to guide the material to be weighed in an uninterrupted stream into a weighing receptacle. In known devices of this kind the weighing-beam releases at a certain point of time at which the weight to be weighed is exactly or nearly reached, an oscillating or rocking movement of the feed means. In these devices the released rocking movement of the feed means is then solely controlled by influences dependent on the construction and shape of the different parts of the device while the weighing-beam has no further control upon said movement released by it. The speed of the rocking movement and consequently the quantity of material supplied to the weighing receptacle while said movement takes place varies therefore in accordance with the design of the members coming into consideration, it being chiefly dependent on the mass of said members. Consequently no continuous influencing or regulation of the quantity of material supplied to the weighing receptacle takes place in the known weighing devices of the kind referred to.

In contradistinction thereto the movement of the feed means of the automatic weighing device according to this invention is continually dependent on the weight of the progressively filling weighing receptacle carried by the weighing-beam. Thereby the rocking movement of the feed means of this device is so regulated by the fullness of the weighing receptacle that upon reaching the weight to be weighed the feed-means is moved at a greater speed than the speed of the scale beam, and preferably given a sudden movement to such an amount that any further supply of material to the weighing receptacle ceases at the moment at which said weight is reached.

Preferably, the increase in weight of the weighing receptacle taking place while the latter is filled can be converted into a progressive rotary movement of the weighing-beam; this rotary movement is then employed for automatically controlling the progressive rocking movement of the feed means. The automatic control of the rocking movement of the feed means can be attained by means of a device actuated by the weighing-beam and acting upon a source of power which in its turn acts upon the feed means.

The governing of the means causing under the influences of the weighing-beam the turning off or deviation of the stream of material can be effected pneumatically.

This invention will now be more particularly described with reference to the accompanying drawings illustrating by way of example several modes of carrying out the invention.

Figs. 5 and 6 are sections through two further embodiments of the invention in which the means acting upon the feed means in order to rock them comprise a pump adapted to compress air.

Like reference letters refer to like parts throughout the drawings.

Figure 1:
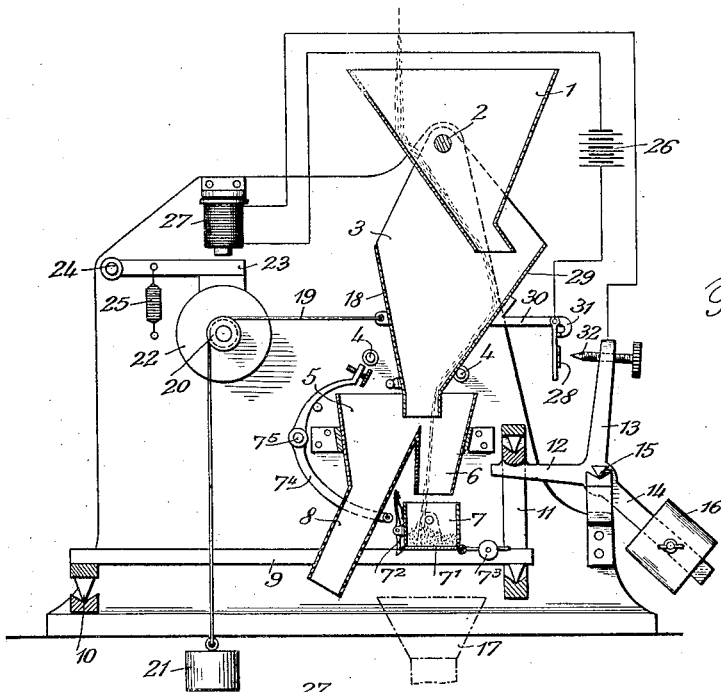
Figure 1 is a vertical cross-section through a first embodiment of the invention in which the source of power acting upon the feed means in order to rock them has the shape of a weight attached to a rope connected at its second end to said means.

Referring at first to Fig. 1, 1 denotes a filling hopper into which is let fall the material to be weighed. On a shaft 2 is pivotally mounted a hopper-like trough 3 constituting the feed means adapted to convey the material to be weighed into the weighing receptacle 7. 4 are stops for the pivotally mounted trough 3. Beneath the trough 3 is arranged a distributing hopper 5 divided into two sections 6, 8. The section 6 leads to the weighing receptacle 7, while the section 8 leads to a point situated outside the weighing receptacle 7. The latter is provided with a bottom flap $7^1$ normally kept in the position illustrated in Fig. 1 by a pawl $7^2$ and a counter-weight $7^3$. $7^4$ designates a double armed lever pivotally mounted at $7^5$ against which the trough 3 is adapted to strike when it has been rocked a certain amount in a clockwise direction, in which case the pawl $7^2$ is then caused to release the bottom flap $7^1$. The weighing receptacle 7 rests on a supporting beam 9. This is supported at one end in a stationary manner at 10. The second end of the beam 9 is carried by a vertically movable frame 11 engaging with an arm of a three armed lever 12, 13, 14 pivotally mounted at 15. To the arm 14 of the lever 12, 13, 14 is fixed a weight 16; the arms 12, 14 constitute a weighing-beam having the shape of an angle lever. The weight 16 is detachably fixed to the arm 14 so that it can be easily replaced by another one. Beneath the weighing receptacle 7 is arranged a hopper 17 leading to suitable means not shown adapted to receive the goods discharged from the receptacle 7. To a wall 18 of the trough 3 is fixed a rope 19 passing over a guide-roller 20 and carrying at its free end a weight 21. On the same shaft as the guide-roller 20 is fixed a disk 22; against the latter is normally pressed a brake block 23 provided with an armature of iron and pivotally mounted at 24. The brake block 23 is acted upon by a spring 25 having the tendency to move it toward the disk 22.

27 is an electromagnet placed in an electric circuit comprising a source of electricity 26. In this circuit is also placed a contact-plate 28 which is pivotally mounted on an arm 30 fixed to a wall 29 of the trough 3 and insulated from the latter. A stirrup 31 fixed to the arm 30 admits a rocking of the plate 28 only in a clockwise direction. The electric circuit referred to comprises also an adjustable contact pin 32 fixed to the arm 13 of the three armed lever 12, 13, 14.

The operation of a weighing device constructed as hereinbefore described is as follows:

The material to be weighed passes continually from the filling hopper 1 into the trough 3 and from this (in the illustrated working position of the parts) into the channel 6 of the distributing hopper 5. From the latter the material falls into the weighing receptacle 7 which is filled until a determinate weight, that is smaller than the quantity of material to be weighed, is reached. The material streaming into the receptacle 7 after said determinate weight is reached, causes a gradual downward movement of the supporting beam 9, the arm 12 of the weighing-beam 12, 14 being thereby moved gradually out of its horizontal position and the arm 14 being lifted in an anti-clockwise direction from its inclined position toward the horizontal position. In consequence of this, the arm of lever of the weighing receptacle 7 is shortened only to a very small amount while the moment of the weight 16 gradually increases as the arm 14 is so moved as to be caused to approach the horizontal position. The described weighing device acts therefore in contradistinction to the ordinary scales in which the weighing-beam is caused to rotate further until it is arrested by a stop as soon as a very small overweight acts on one of its sides, in the same manner as the letter-scale in which different positions of an invariable weight correspond to different weights in the pan of the scale. In each position of the parts of the novel device the moment of the weighing receptacle 9 and the material contained therein keeps in equilibrium to the moment of the weight 16—which moment increases owing to the increase in length of the arm of lever—until the arm 13 has been rocked into the position in which the contacts 32 and 28 touch one another. At this moment the brake block 23 is attracted by the electromagnet 27 so that the weight 21 is now able to rock the trough 3 by a certain amount in a clockwise direction. As a result of said movement imparted to the trough 3, the contacts 28 and 32 are moved apart so that the brake block 23 is again brought to act upon the disk 22 stopping thereby the rocking movement of the trough 3. The material falling in the meanwhile into the weighing receptacle 7 then causes a farther downward movement of the supporting beam 7 so that the contacts 28 and 32 are again caused to touch one another.

The mutual arrangement of the trough 3 and of the partition wall of the distributing hopper 5 is such that when the desired weight of the weighing receptacle 7 filled with material is reached, the trough 3 has been rocked to such an amount in a clockwise direction that the material falling continually into the trough 3 passes no longer into the channel 6 but into the channel 8 of the distributing hopper 5, in which case it is no longer supplied to the receptacle 7. Meanwhile the flat bottom $7^1$ of the receptacle 7 has been released by the pawl $7^2$, the content of said receptacle being then discharged, and the weighing-beam has been moved back into the position illustrated in Fig. 1. The trough 3 remains in its second position of rest, i. e. in the position in which it is arrested by the stop 4 shown in Fig. 1 on the left hand side of it, until it is moved back by hand into the first position of rest, i. e. into the position shown in Fig. 1.

It will be seen that in the described weighing device the rocking movement of the trough 3 is constantly dependent on the weight of the progressively filled weighing receptacle 7. Thereby this rocking movement is so controlled that when the exact weight to be weighed is reached, the trough 3 has been rocked to such an amount in a clockwise direction that any further supply of material to the receptacle 7 ceases just at the moment at which said weight has been reached. In other words, the rocking movement of the trough 3 is so regulated that the latter supplies a certain quantity of material to the channel 6 of the hopper 5 and consequently to the receptacle 7 until the weighing-beam 12, 14 has reached a determinate position; however when the weighing-beam 12, 14 reaches said determinate position—which corresponds to a determinate position of equilibrium of the scale and consequently to a determinate weight of the weighing-receptacle 7—the trough 3 has already been brought into a position in which any further supply of material to the receptacle 7 is stopped at once. Said determinate position of the weighing-beam referred to corresponds to the position of the trough 3 in which its outer edge (in Fig. 1 the right hand edge) is situated exactly above the partition wall of the distributing hopper 5.

Figure 2:
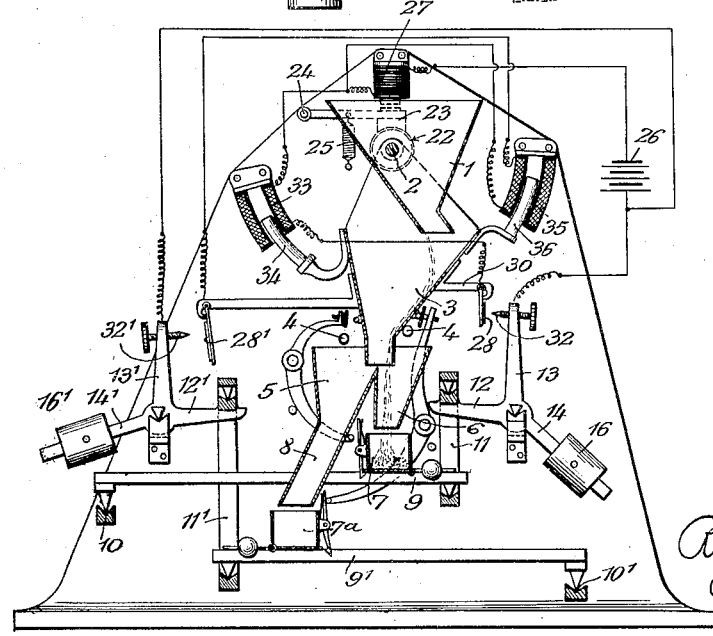
Fig. 2 is a vertical cross-section through a second embodiment in which the rocking movement of the feed means is effected in both directions by solenoids.

In the embodiment of the invention illustrated in Fig. 2 the rocking movement of the trough 3 in one direction is not brought about by a weight 21 but by a solenoid 33 the core 34 of which is fixed to a wall of the trough 3. The rocking movement of the trough 3 in the opposite direction is also brought about automatically, for instance by a solenoid 35 the core 36 of which is fixed to a second wall of the trough 3. Stops 4 are for the limitation of the rocking movements of the trough 3. The solenoid 33 is placed in an electric circuit comprising the source of electricity 26 and the solenoid 27 and adapted to be closed when the contacts 28, 32 are caused to touch one another; the solenoid 35 is placed in an electric circuit which is also connected to the source of electricity 26 and to the solenoid 27 and closed as soon as the contacts $28^1$, $32^1$ are caused to touch one another. The contacts $28^1$, $32^1$ are controlled by a lever $12^1$, $13^1$, $14^1$ engaging with a vertically movable frame $11^1$. The latter carries one end of a supporting beam $9^1$ the second end of which is supported in a stationary manner at $10^1$. The supporting beam $9^1$ carries a weighing receptacle $7^a$.

In this embodiment of the invention the trough 3 is rocked in a clockwise direction by the solenoid 33 repeatedly excited upon a repeated opening and closing of the contacts 28, 32 (which is effected in the same manner as it has been described with reference to Fig. 1). When the trough 3 has been rocked by a certain amount in said direction the material falls no longer into the channel 6 but into the channel 8 of the hopper 5 and from the latter into the receptacle $7^a$. When the weight of this receptacle $7^a$ reaches a determinate value, the contacts $28^1$ and $32^1$ are repeatedly closed and opened which is brought about in the same manner as it has been described with regard to the contacts 28, 32 of the first embodiment. Each time that the contacts $28^1$, $32^1$ are closed, the solenoid 35 is excited and at the same time the brake block 23 releases the disk 22, the trough 3 being then rocked in an anticlockwise direction toward the right. When the determinate weight of the weighing receptacle $7^a$ has been reached, the trough 3 has just been rocked to such an amount in an anticlockwise direction that the material is no longer supplied to the receptacle $7^a$, but again to the weighing receptacle 7 which in the meanwhile has been brought back into the position illustrated in Fig. 2.

Figure 3:
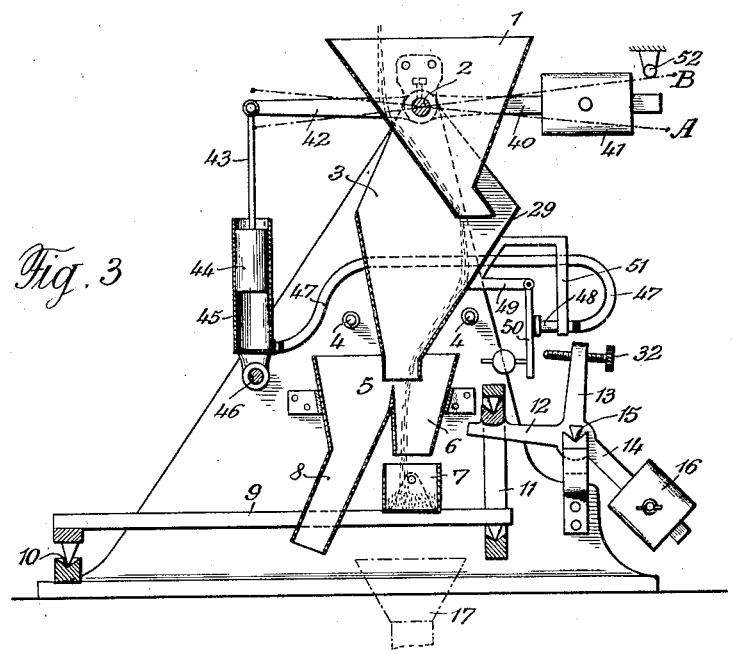
Fig. 3 is a vertical cross-section through a further embodiment in which the means acting upon the feed means in order to rock them comprise a vacuum pump.

In the embodiment of the invention illustrated in Fig. 3 the trough 3 pivotally mounted on the shaft 2 is rigidly connected to a double armed lever which is also pivotally mounted on said shaft 2. The arm 40 of this lever carries a weight 41 while its second arm 42 is connected to a piston 44 of a vacuum pump 45 by means of a rod 43. The pump 45 is pivotally mounted on a shaft 46 and it is connected with a flexible air-conduit 47 fixed thereto. The free end of the conduit 47 carries a short pipe 48 provided with an elastic seat. To the wall 29 of the trough 3 is fixed a bracket to one arm 49 of which is pivotally secured a plate 50 normally kept in position by a counterweight $50^1$. The second arm 51 of said bracket carries the air-conduit 47. 4 are the stops provided for the limitation of the rocking movement of the trough 3. 52 is a stop member for limiting the movement of the double armed lever 40, 41. For the rest, the construction of the device shown in Fig. 3 corresponds to that of the device illustrated in Fig. 1.

The operation of the weighing device illustrated in Fig. 3 is as follows:

The weight 16, its distance from the axis of rotation 15 as well as the angle which the arm 14 incloses with the horizontal are so chosen that at the moment at which the weight of the receptacle 7 and its contents reaches a value which is smaller than that to be weighed, the pin 32 strikes against the plate 50. At this time there exists in the pump 45 a vacuum generated in a manner that will be described more fully later on and which keeps the equilibrium to the weight 41 so that the trough 3 is kept in a position of rest. When however the plate 50 is acted upon by the pin 32, it is moved somewhat away from the short pipe 48 against which it has been resting until now in an air-tight manner by gravity. The result of this is that a certain quantity of air will flow into the air conduit 47 and consequently into the cylinder 45 so that the weight 41 causes a rocking of the double armed lever 40, 42 and the trough 3 rigidly connected to it is moved to a certain amount in a clockwise direction. Owing to said movement imparted to the trough 3, the plate 50 is again moved away from the pin 32, it being caused by its gravity to close again in an air-tight manner the outlet of the short pipe 48. Any rocking movement of the trough 3 is then prevented until the material supplied in the meantime to the weighing receptacle 7 causes the pin 32 to strike anew against the plate 50, whereupon a fresh quantity of air causing a new rocking movement of the trough 3 passes into the cylinder 45. The hereinbefore described working cycle is repeated until the stream of material flowing continually through the hopper 1 and the trough 3 is diverted wholly from the channel 6 and the receptacle 7 respectively, and guided into the channel 8. Thereby, the double armed lever 40, 42 is gradually moved into the position A shown in point and dash lines. When the receptacle 7 has been emptied in a manner not shown, the double armed lever is moved by hand from the position A into the position B also shown in point and dash lines; thereby the piston 44 of the pump is forced downwardly causing the air to escape through the pipe 48. Hereupon the plate 50 is forced by the counterweight $50^1$ against the elastic seat of the short pipe 48 in order to close the outlet of the latter in an air-tight manner and the weight 41 is released. In consequence of this the piston 44 is lifted and a vacuum is produced in the pump 45 and in the conduit 47, while the double armed lever 40, 42 is returned into the position shown in full lines.

Figure 4:
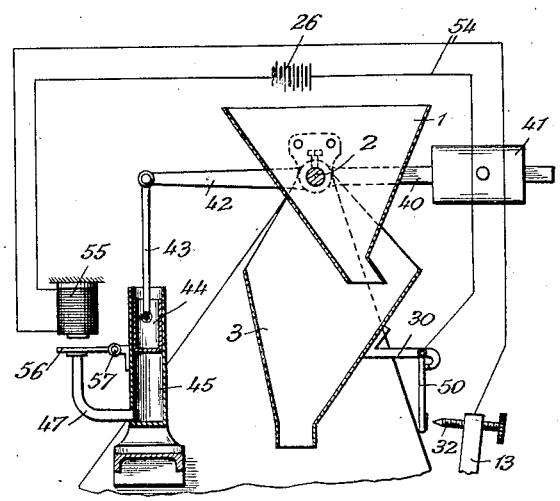
Fig. 4 illustrates an arrangement similar to that shown in Fig. 3 comprising electro-magnetically acting means for relieving the vacuum.

In the arrangement illustrated in Fig. 4 the vacuum is not relieved mechanically but in an electro-magnetic manner. To this end the plate 50 and the pin 32 formed as contacts are placed in an electric circuit 54 in which are also placed the source of electricity 26 and the electromagnet 55. The pump 45 is stationary and its piston 44 is pivotally connected to the rod 43 which in its turn is connected to the double armed lever 40, 42. The conduit 47 is normally closed at one end by a plate 56 pivotally fixed at 57 to the pump 45 and constituting the armature of the electromagnet 55. When the contact 32 is caused to touch the plate 50, the plate 56 is attracted by the electromagnet 55 and the vacuum in the pump 45 relieved, the weight 41 imparting thereby a rocking movement to the trough 3.

Instead of designing the pump 45 as a vacuum pump it can also be designed as air compressor. Such an embodiment is illustrated in Fig. 5, where the movement of the lever $40^1$ from the position B into its position of rest corresponds to the pressure stroke of the pump 45. Also in this case the plate 50 is pressed by the counterweight $50^1$ against the resilient seat of the short pipe 48. The bottom of the pump 45 is provided with a flap $45^1$ controlling the passage of the air into the cylinder of the pump 45 during the suction stroke of the latter, i. e. when the lever $40^1$ is moved from the position A into the position B. For the rest the construction of this embodiment corresponds to that of the device illustrated in Fig. 3. Also the operation of this construction corresponds to that of the device shown in Fig. 3, with the only difference that the pump 45 does not act as a vacuum pump but as an air compressor.

In the arrangement shown in Fig. 6 the space between the piston 44 of the pump 45 is connected to a vessel 60 filled with compressed air. A pump 61 connected to the vessel 60 maintains in the latter a constant pressure. When the pressure within the cylinder of the pump 45 decreases owing to the lifting of the plate 50, compressed air starts to flow from the vessel 60 into the space of the pump 45 situated beneath the piston 44. A throttle valve 62 arranged between the pump 45 and the vessel 60 provides that the quantity of air passing through it is under all circumstances smaller than the quantity of air escaping through the small pipe 48. Upon a lifting of the plate 50 the trough 3 is at first rocked in the manner described with reference to the embodiments already described in a clockwise direction, while it is rocked in the opposite direction when the plate 50 is again caused by gravity to close the outlet of the pipe 48 in an air-tight manner, owing to the action exerted in this case upon the piston 44 by the compressed air which in the meanwhile passed from the vessel 60 into the pump 45. In the device illustrated in Fig. 6 not only any air losses due to the leakages occurring at the piston 44 are compensated but the retrogressive movement of the trough 3 imparted to it while the valve 48, 50 is closed has the effect to increase the accuracy of the weighing operation.

I claim—

1. An automatic weighing device, comprising a scale beam, a weighing receptacle thereon, movable feed means to direct the material to be weighed into said receptacle, mechanism for effecting the movement of said feed means to direct the stream of material outside of the weighing receptacle, and means to prevent the operation of said mechanism until after the scale beam has moved a predetermined amount and to continuously control said operation until the exact weight of material is attained.

2. An automatic weighing device of the character described, comprising a weighing receptacle, feed means adapted to be rocked relatively to said receptacle and to direct the material to be weighed into the latter, a pivotally mounted weighing-beam, means carrying the weighing receptacle and operatively connected to the weighing-beam and adapted to convert at first the increase in weight of the progressively filled weighing receptacle into a progressive rotary movement of the weighing-beam, and means controlled by the weighing beam after a predetermined movement of said beam adapted to effect a rocking movement of said feed means.

3. An automatic weighing device of the character described, comprising a weighing receptacle, feed means adapted to be rocked relatively to said receptacle and to direct the material to be weighed into the latter, a pivotally mounted weighing-beam movable independently of said feed means, means carrying the weighing receptacle and operatively connected to the weighing-beam and adapted to convert at first the increase in weight of the progressively filled weighing receptacle into a progressive rotary movement of the weighing-beam, and means controlled by the weighing-beam adapted to effect pneumatically a rocking movement of said feed means when the weighing-beam has moved to its proper position of weight.

4. An automatic weighing device of the character described, comprising a weighing receptacle, feed means adapted to be rocked relatively to said receptacle and to direct the material to be weighed into the latter, a pivotally mounted weighing-beam, means carrying the weighing receptacle and operatively connected to the weighing-beam and adapted to convert at first the increase in weight of the progressively filled weighing receptacle into a progressive rotary movement of the weighing-beam, a member rigidly connected to the feed means moving the same, a weight acting upon said member and having the tendency to rock the latter and consequently the feed means in a direction causing a deviation of the current of material from the weighing receptacle, pneumatic means connected to the first mentioned member and adapted to act upon said first mentioned member in a sense opposite to that in which said weight acts, and means acted upon by the weighing-beam and adapted to control the pressure of compressed air acting upon said pneumatic means.

5. An automatic weighing device, comprising a weighing receptacle, feed means adapted to be rocked relatively to said receptacle and to direct the material to be weighed into the latter, a pivotally mounted weighing-beam, means carrying the weighing receptacle and operatively connected to the weighing-beam and adapted to convert at first the increase in weight of the progressively filled weighing receptacle into a progressive rotary movement of the weighing-beam, an arm rigidly connected to the feed means, a weight fixed to said arm having the tendency to move the latter and consequently said feed means in a direction to cause a deviation of the current of material from the weighing receptacle, a pump adapted to compress air and having a piston connected to said arm and acting upon the latter in a sense opposite to the sense in which said weight acts upon said arm, and means acted upon by the weighing-beam regulating the pressure acting upon the piston of said pump.

6. An automatic weighing device of the character described, comprising a weighing receptacle, feed means adapted to be rocked relatively to said receptacle and to direct the material to be weighed into the latter, a pivotally mounted weighing-beam, means carrying the weighing receptacle and operatively connected to the weighing-beam and adapted to convert at first the increase in weight of the progressively filled weighing receptacle into a progressive rotary movement of the weighing-beam, a member rigidly connected to the feed means, a weight acting upon said member and having the tendency to move the latter and consequently the feed means in a direction causing a deviation of the current of material from the weighing receptacle, a pump adapted to act as an air compressor and having a piston connected to said member and acting upon the latter in a sense opposite to the sense in which said weight acts upon said member, means controlled by the weighing-beam adapted to regulate the pressure acting upon the piston of said pump, a vessel filled with compressed air communicating with the interior of the cylinder of the pump, and means whereby the pressure within said vessel is kept constant.

7. An automatic weighing device, of the character described, comprising a pivotally mounted trough, a distributing hopper divided into two sections by a partition wall, the trough supplying the material to be weighed to said hopper, a weighing receptacle arranged beneath the distributing hopper, a pivotally mounted mechanism operatively connected to the weighing receptacle, and means controlled by said mechanism for oscillating the trough.

8. An automatic weighing device, comprising a scale beam, a weighing receptacle thereon, movable feed mechanism to direct the material to be weighed into said receptacle and when operated to direct material outside of said receptacle, and means to prevent the operation of said mechanism until after the scale beam has been moved a predetermined amount, and to continuously control said operation until the exact weight has been attained, said means including a device adjustable for the position at which said operation shall begin relatively to movement of said beam.

9. An automatic weighing machine comprising a scale beam having a substantially horizontal weighing arm, an arm at an angle thereto and a weight on the latter arm whereby the moment of the weighing arm is substantially constant and the moment of the arm carrying the weight progressively increases, movable feed means to direct material to be weighed to the weighing arm, mechanism to prevent the movement of said means and means operated by said beam to cause the operation of said mechanism to suddenly move the feed means.

In testimony that I claim the foregoing as my invention, I have signed my name.

RICHARD LEUMANN.

Witnesses:
H. VAUE,
H. RAPING.